ical compositions characterized by accelerating action for glucuronide formation comprising uridine-5'-monophosphate or its pharmaceutically acceptable salt in admixture with pharmaceutical carriers.

United States Patent [19]
Tamura

[11] 3,852,433
[45] Dec. 3, 1974

[54] URIDINE-5-MONOPHOSPHATE COMPOSITIONS

[75] Inventor: Shunkichi Tamura, Funabashi, Japan

[73] Assignee: Yamasa Shoyu Kabushiki Kaisha, Chiba-ken, Japan

[22] Filed: Apr. 6, 1973

[21] Appl. No.: 348,658

[52] U.S. Cl........ 424/180, 260/112.5, 260/211.5 R, 260/343.7, 260/251
[51] Int. Cl. .......................... A01n 9/00, A01n 9/28
[58] Field of Search............... 424/180; 260/211.5 R

[56] References Cited
OTHER PUBLICATIONS

Chem. Abstracts, (1964), Vol. 68, paragraph 16, 649(h).

Primary Examiner—Elbert L. Roberts
Attorney, Agent, or Firm—Wenderoth, Lind & Ponack

[57] ABSTRACT

Pharmaceutical compositions characterized by accelerating action for glucuronide formation comprising uridine-5'-monophosphate or its pharmaceutically acceptable salt in admixture with pharmaceutical carriers.

8 Claims, No Drawings

URIDINE-5-MONOPHOSPHATE COMPOSITIONS

The present invention relates to pharmaceutical compositions comprising uridine-5'-monophosphate or its pharmaceutically acceptable salt having accelerating action for glucuronide formation and to methods using the same.

Glucruronide formation is a most typical one of detoxication mechanisms in a living body and uridine-5'-monophosphate is known to be a biochemical precursor of uridine-5'-diphosphate-glucuronic acid which functions as a glucuronyl donor in the glucuronide formation. However, its use as a pharmaceutical agent has not been investigated.

According to the present invention, it has been found that uridine-5'-monophosphate is a potent accelerator for the glucuronide formation.

Hitherto, sulfur-containing amino acids and peptides, such as methionine, cysteine, and glutathione, have been used clinically as biochemical antidotes. These compounds are known to participate in detoxication by accelerating oxidation-reduction reaction and amine acid conjugation in vivo. However, these reactions are not primary in detoxication.

On the other hand, according to the present invention, uridine-5'-monophosphate has been found to be a potent accelerator for the glucuronide conjugation which is a most important reaction in detoxication in living bodies. Accordingly, uridine-5'-monophosphate can be considered to be a novel biochemical antidote different from the known biochemical antidotes such as methionine, cysteine and glutathione in point of the drug action.

Thus, the administration of uridine-5'-monophosphate is to be an effective method of treating not only detoxication disturbances, in which it is desired to obtain an increase in the glucuronide forming ability such as liver-failure, but also various metabolic diseases which are caused by a decrease in the glucuronide forming ability such as icterus-neonatorium, Gilbert's disease.

It is therefore the primary object of the present invention to provide a pharmaceutical composition having accelerating action for glucuronide formation which contains, as an active ingredient, uridine-5'-monophosphate-glucuronic acid or its pharmaceutically acceptable salts, in admixture with a pharmaceutical carrier.

According to the present invention, there is provided a pharmaceutical composition as an accelerator for glucuronide formation in dosage unit form comprising uridine-5'-monophosphate or its pharmaceutically acceptable salt as active ingredient and a pharmaceutical carrier.

The foregoing object as well as efficaciousness of the present invention will become more apparent from the following detailed description thereof.

The carrier can be either solid pharmaceutical carrier or diluent when intended for oral administration or as a suppository, or sterile injectable liquid pharmaceutical carrier or diluent when intended for parenteral administration, or liquid pharmaceutical carrier or diluent possibly in admixture with sweetening and/or flavoring agent when intended for oral administration.

The pharmaceutical composition according to the present invention can be utilized in any of the dosage forms conventionally used for oral or parenteral administration.

As the dosage form suitable for oral administration, powder, tablets, pills, capsules and dragees may be mentioned as examples.

The composition may be associated with the conventional carrier or diluent such as lactose, starch, calcium phosphate, talc, magnesium stearate, polyvinyl pyrrolidone, carboxymethyl cellulose and gelatine.

The liquid composition for oral administration may preferably be used in the form of syrup, emulsion or suspension, in which a sweetening agent such as sucrose, fructose, glucose, mannitol, sorbitol, and/or flavoring agents such as cherry, fruit, orange, mint, may be added.

The suppository is suitable for rectal administration. As a substrate, cacao butter, for example, may be used.

When the composition is to be used for parenteral administration, they must be sterile, and used in the form of ampoules or vials with sterile injectable liquid pharmaceutical carrier or diluent such as sterile injectable water and physiological saline.

The present composition may be used in association with the known biochemical antidotes such as methionine, cysteine and glutathione, as well as with vitamins such as vitamin B group and vitamin C.

In case of treating human beings, the average daily dose is in general between 20 and 1,000 mg or more preferably between 50 and 500 mg.

The results of toxicological and pharmacological tests on sodium salt of uridine-5'-monophosphate (sodium salt of UMP) are as follows.

(I) ACUTE TOXICITY

A solution of sodium salt of UMP in sterile distilled water was administered orally, subcutaneously, and intraperitoneally to ICR-mice (6-weeks), and Sprague Dowley rats (6-weeks), respectively.

The results obtained are shown in Table I below.

Table I

| Route of Administration | Average Lethal Dose (LD 50) mg/kg | |
|---|---|---|
| | Mouse | Rat |
| P.O. | 12,000 | 12,000 |
| S.C. | 4,416 | 6,000 |
| I.P. | 3,522 | 3,169 |

Note:
P.O. ... oral administration
S.C. ... subcutaneous administration
I.P. ... intraperitoneal administration

(II) EFFECTS ON GLUCURONIDE FORMATION IN LIVER

Wistar-albino rats, each having an average weight of 150 g, were used as test animals. Glucuronide formation in liver was determined by using O-aminophenol as substrate.

(Experiment 1)

10 mg/kg of sodium salt of UMP, dissolved in 0.5 ml of physiological saline, were then intraperitoneally administered to the rats once in a day. After 3 days, rats were killed by decapitation. O-aminophenyl glucuronide formation was determined by using liver slice preparation.

This experiment was carried out after the administration of physiological saline had been proved to have no effect on the glucuronide formation in liver.

The results are shown in Table II below assuming that glucuronide formation in physiological saline-administered rats is "100".

Table II

| Compound | Glucuronide Formation |
|---|---|
| NaCl | 100.0 |
| Sodium salt of UMP | 152.1 |

(Experiment 2)

The relationship between the dosage of UMP-Na and the accelerating action for O-aminophenyl glucuronide formation was investigated.

The experimental method was the same as that in Experiment 1. The results are shown in Table III below.

Table III

| Dosage (mg/kg) | Glucuronide Formation |
|---|---|
| Control (NaCl) | 100 |
| 1 | 143.5 |
| 5 | 146.8 |
| 10 | 153.2 |
| 15 | 154.9 |

As is clear from Tables I, II, and III, sodium salt of uridine-5'-monophosphate exhibits very low toxicity and potent accelerating action for glucuronide formation in liver.

The dosage forms of the present invention are shown in the following examples.

EXAMPLE 1 (VIALS)

200 mg of sodium salt of UMP, pyrogen-free, was dissolved in 2 ml of distilled water for injection into a vial, and lyophilized in vaccuo.

EXAMPLE 2 (AMPOULES)

200 mg of sodium salt of UMP, pyrogen-free, was dissolved in 2 ml of distilled water for injection, filled into an ampoule, and sterilized.

EXAMPLE 3 (TABLETS)

| Sodium salt of UMP | 100 mg |
|---|---|
| Lactose | 90 do. |
| Starch | 50 do. |
| Talc | 8 do. |
| Magnesium stearate | 2 do. |

The above components were uniformly mixed, and formed into a tablet having a diameter of 8.0 mm.

EXAMPLE 4 (POWDER)

| Sodium salt of UMP | 20 g |
|---|---|
| Calcium phosphate, dibasic | 50 do. |
| Lactose | 30 do. |

The above components were uniformly mixed and prepared as powder.

EXAMPLE 5 (CAPSULES)

| Sodium salt of UMP | 100 mg |
|---|---|
| Methionine | 100 do. |
| Thiamine hydrochloride | 10 do. |
| Calcium phosphate, dibasic | 100 do. |
| Talc | 10 do. |

The above ingredients were uniformly mixed and filled into a capsule.

EXAMPLE 6 (TABLETS)

| Sodium salt of UMP | 100 mg |
|---|---|
| Thiamine hydrochloride | 2 do. |
| Ascorbic acid | 10 do. |
| Lactose | 155 do. |
| Starch | 30 do. |
| Magnesium stearate | 3 do. |

The above components were mixed uniformly and made up into a tablet having a diameter of 10.0 mm.

What I claim is:

1. A pharmaceutical composition as an accelerator for glucuronide formation in dosage unit form comprising an effective amount of uridine-5'-monophosphate or its pharmaceutically acceptable salt as active ingredient and a pharmaceutical carrier.

2. The pharmaceutical composition according to claim 1, wherein each dosage unit contains from 50 mg to 500 mg of uridine-5'-monophosphate as its sodium salt.

3. The pharmaceutical composition according to claim 1, further containing a substance selected from the group consisting of methionine, cysteine and glutathione as a biochemical antidote.

4. The pharmaceutical composition according to claim 1, further containing a vitamin selected from the group consisting of group B vitamins and vitamin C.

5. The pharmaceutical composition according to claim 3, further containing a vitamin selected from the group consisting of group B vitamins and vitamin C.

6. A method of administering to humans, a pharmaceutical composition as an accelerator for glucuronide formation in dosage unit form comprising an effective amount of uridine-5'-monophosphate or its pharmaceutically acceptable salt, as the accelerator for glucuronide formation, and a pharmaceutical carrier.

7. A method according to claim 6 wherein each dosage unit contains 50 mg. to 500 mg. of uridine-5'-monophosphate as its sodium salt.

8. A method according to claim 7 wherein the pharmaceutical composition further contains a substance selected from the group consisting of methionine, cysteine and glutathione as a biological antidote.

* * * * *